(12) United States Patent
Xu et al.

(10) Patent No.: US 12,104,321 B2
(45) Date of Patent: Oct. 1, 2024

(54) OXYGEN BLEACHING METHOD OF PULP

(71) Applicant: Beijing Forestry University, Beijing (CN)

(72) Inventors: Feng Xu, Beijing (CN); Wenqiu Zheng, Beijing (CN); Xiaoyu Wang, Beijing (CN); Tingting You, Beijing (CN); Hongwei Zhu, Beijing (CN)

(73) Assignee: BEIJING FORESTRY UNIVERSITY, Beijing (CN)

( * ) Notice: Subject to any disclaimer, the term of this patent is extended or adjusted under 35 U.S.C. 154(b) by 0 days.

(21) Appl. No.: 18/113,901

(22) Filed: Feb. 24, 2023

(65) Prior Publication Data
US 2023/0272580 A1    Aug. 31, 2023

(30) Foreign Application Priority Data
Feb. 26, 2022    (CN) ..................... 202210181108.X

(51) Int. Cl.
*D21C 9/10*    (2006.01)
*D21C 9/02*    (2006.01)

(52) U.S. Cl.
CPC ............. *D21C 9/1036* (2013.01); *D21C 9/02* (2013.01); *D21C 9/1068* (2013.01)

(58) Field of Classification Search
CPC ....... D21C 9/1068; D21C 9/163; D21C 9/147
See application file for complete search history.

(56) References Cited

U.S. PATENT DOCUMENTS 3,843,473 A * 10/1974 Croon et al. ......... D21C 9/1026
8/111
4,132,589 A * 1/1979 Christensen ......... D21C 9/1068
8/111

(Continued)

FOREIGN PATENT DOCUMENTS

CN    1050643 C    3/2000
CN    104452395 A    3/2015

OTHER PUBLICATIONS

Erhardt et al., AOX degradation of the pulp and paper industry bleaching wastewater using nZVI in two different agitation processes, Feb. 13, 2021, Elsevier, p. 5 (Year: 2023).*

(Continued)

*Primary Examiner* — Dennis R Cordray
*Assistant Examiner* — Elisa H Vera
(74) *Attorney, Agent, or Firm* — Robert P. Michal, Esq.; Carter, DeLuca & Farrell LLP

(57) ABSTRACT

An oxygen bleaching method of pulp includes the steps of: adding a solution formulated by a magnesium salt and an activator to an unbleached chemical pulp, stirring to be mixed well, and bleaching by introducing oxygen. The activators are nano zero-valent metals that are conventional, low-cost, and recyclable. These activators can activate low-concentration oxygen at low-temperature in neutral aqueous solution to efficiently generate peroxide anion radicals, so as to promote the generation of hydroperoxide anions and peroxide ions, achieving high efficient delignification. The whole process does not generate waste water, the oxygen consumption is only 50-85% of the original process, the yield is increased by 1.5-2.8% compared with the original system, the pulp brightness is increased to 28-32° SR, and the magnesium salt can be recycled and reused.

11 Claims, 1 Drawing Sheet

(56) References Cited

U.S. PATENT DOCUMENTS

| | | | | |
|---|---|---|---|---|
| 2016/0096999 | A1* | 4/2016 | Powell | C08H 8/00 |
| | | | | 585/242 |
| 2019/0003119 | A1* | 1/2019 | Robinson | D21H 27/004 |
| 2019/0226153 | A1* | 7/2019 | Courchene | D21H 11/20 |
| 2021/0062420 | A1* | 3/2021 | Ji | D21C 1/02 |

OTHER PUBLICATIONS

Notification to Grant Patent Rights for Invention issued by the The State Intellectual Property Office of People's Republic of China in relation to Chinese Application No. 202210181108.X dated Nov. 22, 2022 (1 page) along with English language translation (2 pages).

Christina R. Keenan, et al., "Ligand-Enhanced Reactive Oxidant Generation by Nanoparticulate Zero-Valent Iron and Oxygen" Environmental Science & Technology, vol. 42, 6936-6941, Received May 23, 2008. Revised manuscript received Jul. 4, 2008. Accepted Jul. 7, 2008.

Junhua Zhang, et al., "Effect of Industrial Grade MgO with Different Particle Sizes on the Bleaching of Poplar Chemi-Thermomechanical Pulp" American Chemical Society, dx.doi.org/10.1021/ie400140z, Industrial & Engineering Chemistry Research 2013, 52, 7645-7650.

* cited by examiner

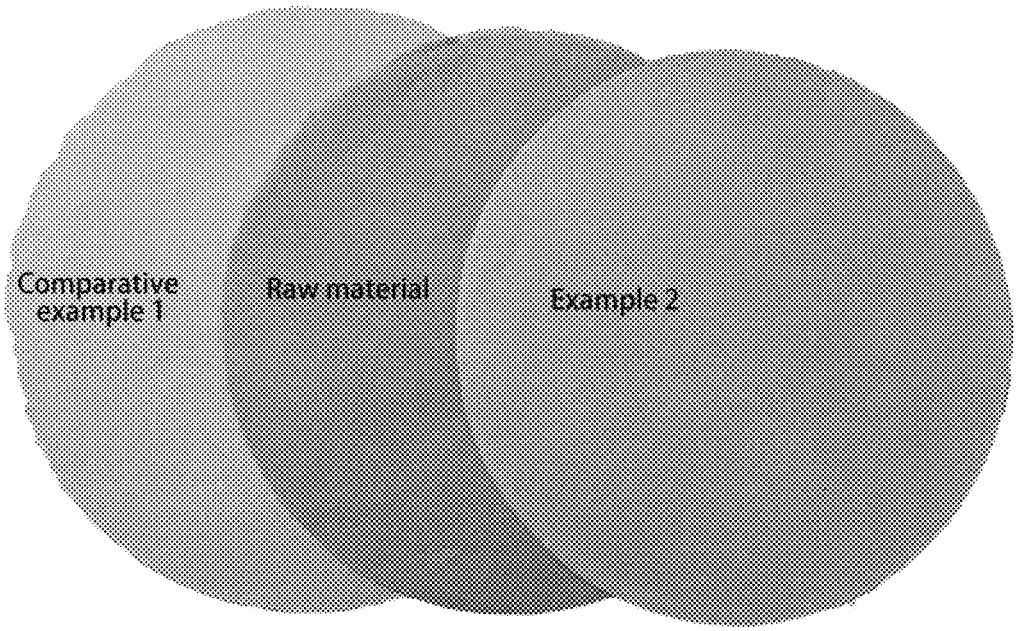

OXYGEN BLEACHING METHOD OF PULP

CROSS-REFERENCE TO RELATED APPLICATIONS

This application claims priority to Chinese Patent Application No. 202210181108.X, filed Feb. 26, 2022, the disclosure of which is expressly incorporated herein by reference in its entirety.

TECHNICAL FIELD

The invention belongs to the field of leather and papermaking, in particular to a clean method for bleaching pulp.

BACKGROUND

Pulp bleaching plays an important role in pulp and paper process, and is an important procedure to improve pulp brightness and brightness stability. The traditional pulp bleaching process would produce a large amount of chlorine-containing and alkali-treated wastewater, which not only is harmful for the environment, but also has a negative impact on the health of animals and humans. In recent years, as the enhancement of people's awareness of their own health and environmental protection, chlorine-containing bleaching technology has been gradually obsoleted, and the use of chlorine-free bleaching technology has become the key to the clean production of pulp bleaching and the sustainable development of the pulp and paper industry.

Oxygen-alkali bleaching, as a completely chlorine-free bleaching technology, is widely used in the bleaching process of chemical pulp. Its main principle is to use oxygen to remove residual lignin under strong alkali and high temperature conditions. In the process of oxygen delignification, $O_2$ is gradually reduced to generate a variety of oxygen free radicals, such as $O_2^-\cdot$, $HO\cdot$, $HOO\cdot$, etc. Under the joint action of these free radicals, lignin is degraded and dissolved. As a mature pulp bleaching technology, oxygen-alkali bleaching technology has the advantages of clean oxygen, recyclable waste liquid, environmental friendliness and good quality of bleached pulp, etc., and has been widely used industrially. For example, CN1050643C discloses a method for oxygen bleaching of medium-concentration pulp, which increases the pulp brightness by 20-25%, and the discharged waste water does not pollute the environment. CN104452395A discloses an oxygen delignification method and equipment for bagasse pulping, wherein by using the process procedures and conditions, the residual lignin in bagasse pulp after cooking can be effectively removed, the amount of chemicals used in the bleaching procedure is reduced, and the bagasse pulp is obtained in high yield with high quality.

However, there are still some problems in the current oxygen-alkali bleaching technology, for example, in an one-stage oxygen bleaching process, oxygen produces free radicals inefficiently, resulting in large oxygen consumption and high energy consumption, and such process must be performed under an alkaline condition, causing degradation of the hemicellulose and cellulose in the pulp, and thus the viscosity of the pulp is decreased, the yield is lowered, and the cost for pulp bleaching and pulp production is increased; and when a two-stage or multiple-stage mild oxygen bleaching process is adopted, the process procedures are cumbersome with a greatly increased equipment cost, which limits its application. Therefore, it is of great significance for promoting low-cost clean pulping to develop a low-temperature oxygen bleaching method for pulp with mild conditions, simple process, low oxygen consumption and high pulp yield.

SUMMARY OF THE INVENTION

In order to solve the above problems in the prior art, according to one embodiment of the present invention, provided is a low-temperature oxygen bleaching method with mild conditions, simple process, low oxygen consumption and high pulp yield. The oxygen bleaching method of pulp according to the present invention comprises: mixing an unbleached chemical pulp with a magnesium salt and an activator in a cooking tank; introducing high-purity oxygen and reacting under stirring. The reaction system of the method is close to neutral and the waste liquid treatment is simple.

The system consists of oxygen, a magnesium salt and an activator, wherein the magnesium salt is one or more selected from the group consisting of magnesium oxide (MgO), magnesium hydroxide ($Mg(OH)_2$), and magnesium sulfate ($MgSO_4$), the activator is one or more selected from the group consisting of nano zero-valent iron, nano zero-valent aluminum, nano zero-valent cobalt, nano zero-valent zinc, and nano zero-valent nickel; and the activator has a size of 100 to 500 nm. These materials are all commercially available as activators.

Preferably, the activator is one or more selected from the group consisting of nano zero-valent iron, nano zero-valent aluminum, and nano zero-valent zinc.

Preferably, the activator is one or both of nano zero-valent iron and nano zero-valent zinc. When the two activators are used together, the mass ratio of the two activators is 1:1 to 1:5.

Preferably, the activator has a size of 100-500 nm.

Preferably, the activator is added in an amount of 0.003-0.5% of the absolute dry mass of unbleached chemical pulp.

Preferably, the magnesium salt is added in an amount of 1.1-3.2% of the absolute dry mass of unbleached chemical pulp.

Preferably, the oxygen is high-purity oxygen, and the oxygen pressure is 0.3-0.6 MPa, preferably, 0.4-0.6 MPa.

The unbleached chemical pulp has a concentration of 10-15% (w/v), more preferably 11-13% (w/v).

In an embodiment, the method mainly comprises steps of:
(1) weighing the magnesium salt and the activator, formulating them into a solution and stirring well;
(2) weighing the unbleached chemical pulp, dispersing the unbleached chemical pulp that is agglomerated, and putting into a cooking tank;
(3) pouring the formulated solution into the cooking tank containing the unbleached chemical pulp, stirring to be mixed well, and then bleaching by introducing oxygen;
(4) washing the bleached chemical pulp with water to be neutral, measuring the pulp yield, performing papermaking, and then measuring the brightness on a brightness meter.

The activators used in the present invention are nano zero-valent metals that are conventional, cheap, and recyclable. These activators can activate low-concentration oxygen at low-temperature (20-40° C.) under neutral aqueous solution (without adding sodium hydroxide) to efficiently produce peroxide anion radicals so as to promote the generation of hydroperoxide anions and peroxide ions, thus achieving high efficient delignification. The whole process does not produce waste water, the oxygen consumption is only 50-85% of the original process, the yield is increased by 1.5-2.8% compared with the original system, the pulp brightness is increased to 28-32° SR, and the magnesium salt can be recycled and reused. This low-temperature oxygen bleaching method with mild conditions, simple process, low oxygen consumption, high pulp yield and good bleaching effect provides an important technical solution for low-cost clean pulp in paper industry.

BRIEF DESCRIPTION OF THE DRAWINGS

FIG. 1 is a picture of the paper of comparative example 1 and example 2.

DETAILED EMBODIMENTS

The present invention will be described in details below. It should be understood that the terms used in the present description and the appended claims should not be interpreted as being limited to the ordinary and dictionary meanings, but should be interpreted according to the meanings and concepts corresponding to the technical aspects of the present invention based on the principle that the inventor is allowed to properly define the terms for best explanation. Accordingly, the descriptions set forth herein are preferred examples for illustrative purposes only and are not intended to limit the scope of the invention, thus it should be understood that other equivalents or improvements can be obtained therefrom without departing from the spirit and scope of the present invention.

The following examples are only presented as examples of embodiments of the present invention, and do not limit the present invention in any extent. Those skilled in the art can understand that all modifications without departing from the spirit and concept of the present invention fall into the protection scope of the present invention. Unless otherwise specified, the reagents and instruments used in the following examples are all commercially available.

Comparative Example 1

This technical process is a process for oxygen bleaching pulp commonly used in the current industry.

Firstly, an unbleached chemical pulp (48 g dry weight, moisture content 56.78%) was weighed in a cooking tank, and the reaction system was 400 mL. Then 1.11 g of NaOH (3% (w/w)), 0.024 g of $MgSO_4$ (0.05% (w/w)) as a protective agent, and 0.0576 g of ethylenediamine tetraacetic acid (EDTA) (0.12% (w/w)) as a chelating agent, and 336.94 g of deionized water were accurately weighed in a beaker, stirred and mixed well. The well mixed solution was poured into the cooking tank containing the unbleached chemical pulp, and reacted for 60 min under the conditions of 0.6 MPa high-purity $O_2$, 90° C. and 30 rpm. The bleached chemical pulp was washed with water to be neutral, and the pulp yield after bleaching is 78.53%. Then a part of the pulp was made into paper, and the brightness was measured on a brightness meter. The measured brightness was 29.40° SR. The brightness of unbleached chemical pulp raw material was 23.73° SR.

Example 1

Firstly, an unbleached chemical pulp (48 g dry weight, moisture content 56.78%) was weighed in a cooking tank, and the reaction system was 400 mL. Then 0.96 g of NaOH (2% (w/w)), 0.48 g of $MgO/MgSO_4$ (1% (w/w), 1:1), 0.0576 g of EDTA (0.12% (w/w)) as a chelating agent, 0.0024 g (0.005% (w/w)) of nano zero-valent iron as an activator with a size of 100 nm, and 336.94 g of deionized water were accurately weighed in a beaker, and stirred well with a glass rod. Finally, the well mixed solution was poured into the cooking tank containing the unbleached chemical pulp, and reacted for 60 min under the conditions of 0.5 MPa high-purity $O_2$, 20° C., and 30 rpm. The bleached chemical pulp was washed with water to be neutral, and the yield of the bleached chemical pulp was 80.25%. Then a part of the pulp was made into paper, and the brightness was measured on a brightness meter, and the measured brightness was 29.70° SR. 3% NaOH was used in comparative example 1, while only 2% NaOH was used in Example 1, and the remaining 1%, i.e. ⅓ of the NaOH, was replaced with 1% magnesium salt. Therefore, by replacing partial NaOH with magnesium salt and adding a small amount of activator, the brightness of the unbleached chemical pulp (23.73° SR) can be significantly improved at room temperature, and the bleaching effect is also better than the conventional oxygen bleaching technology (29.40° SR), and the yield of bleached pulp is increased by 1.72%. That is, the effect of reducing cost and energy consumption can be achieved by this technology.

Example 2

The specific operations were the same as those in Example 1, except that all NaOH was replaced by $MgO/MgSO_4$ with a content of 3% (w/w), i.e., 1.44 g.

The pulp yield after bleaching was 81.33%, and the measured brightness was 28.94° SR, indicating that after replacing all NaOH with $MgO/MgSO_4$, compared with the brightness under strong alkali conditions (29.40° SR), the bleaching effect was deteriorated because, in Example 2, all NaOH was replaced by magnesium salt so that the bleaching condition became milder, but the pulp yield was increased by 2.8%. Compared with brightness of the raw material (23.73° SR), the bleached pulp had higher brightness, so under neutral and room temperature conditions, the addition of a small amount of the activator nano zero-valent iron results in a good bleaching effect. FIG. 1 is a picture of the papers of Comparative Example 1 and Example 2. It can be seen from the FIGURE that, compared with the unbleached pulp, the pulp after adding the activator is whiter, showing that with the addition of the activator, the pulp can also achieve better oxygen bleaching effect under mild conditions of partial neutrality and relatively low temperature.

Example 3

The specific operations were the same as those in Example 2, except that the content of the activator nano zero-valent iron was changed from 0.005% (w/w) to 0.01% (w/w), i.e., 0.0048 g, and the size of the nano zero-valent iron was still 100 nm.

The yield of the bleached chemical pulp was 80.83%, and the brightness was 29.73° SR. Compared with Example 2, the brightness of the pulp increased, and the yield decreased slightly, showing that increasing the amount of the activator nano zero-valent iron may result in strengthened oxygen delignification, increased paper brightness, and decreased pulp yield.

Example 4

The specific operations were the same as those in Example 3, except that the content of the activator nano zero-valent iron was changed from 0.01% (w/w) to 0.3% (w/w), i.e., 0.144 g, and the size of the nano zero-valent iron was still 100 nm.

The yield of the bleached chemical pulp was 80.63%, and the brightness was 30.13° SR. Compared with Example 3, the pulp brightness increased, and the yield was basically the same and slightly decreased, indicating that continuously increasing the amount of the activator nano zero-valent iron may strengthen the effect of oxygen bleaching.

Example 5

The specific operations were the same as those in Example 4, the content of the activator nano zero-valent iron was still 0.3% (w/w), i.e., 0.144 g, except that that the size of the nano zero-valent iron was changed to 400 nm.

The yield of the bleached chemical pulp was 80.51%, and the measured brightness was 30.06° SR. Compared with the result (30.13° SR) of Example 4, the difference between the two bleaching effects was small, and there was no significant difference in pulp yield, showing that the size of the activator nano zero-valent iron has no significant effect on the bleaching effect, that is, nano zero-valent iron with a slightly larger size can be selected to reduce production cost.

Example 6

The specific operations were the same as those in Example 5, except that the bleaching temperature was changed from 20° C. to 30° C.

The yield of the bleached chemical pulp was 80.13%, and the brightness was 31.20° SR. Compared with the result (30.06° SR) of Example 5, the bleaching effect of the process was significantly improved, indicating that increased temperature can improve the catalytic activity of the activator nano zero-valent iron to achieve a better bleaching effect.

Example 7

The specific operations were the same as those in Example 5, except that the bleaching temperature was changed from 20° C. to 40° C.

The yield of bleached chemical pulp was 79.71%, and the brightness was 31.98° SR. Compared with the result (31.20° SR) of Example 6, the bleaching effect of the process was significantly improved, indicating that an appropriately increased temperature can improve the catalytic activity of the activator nano zero-valent iron. However, compared with Example 6, after the temperature was further increased, the yield of the bleached chemical pulp was decreased, so the temperature should not be too high during the bleaching process in view of production cost, catalytic activity of the activator, etc.

Example 8

The specific operations were the same as those in Example 5, except that two activators, nano zero-valent iron and nano zero-valent zinc, were used in combination, and the mass ratio of the two activators was 1:1 (w/w).

The yield of the bleached chemical pulp was 80.28%, and the brightness was 30.25° SR, showing that compared with the case in which nano zero-valent iron is used alone as the activator (Example 5, 30.06° SR), the combined use of the two activators results in no significant increase in the bleaching effect and no significant change in the pulp yield.

Example 9

The specific operations were the same as those in Example 8, two activators of nano zero-valent iron and nano zero-valent zinc were still used in combination, except that the mass ratio of the two activators was 1:2 (w/w).

The yield of the bleached chemical pulp was 80.24%, and the brightness was 30.13° SR. Compared with Example 8 (30.25° SR), the pulp brightness decreased slightly, and the pulp yield did not change significantly, indicating that in the bleaching process, the mixed ratio of the activators has no significant impact on the pulp bleaching effect.

The invention claimed is:

1. An oxygen bleaching method of pulp comprising: mixing an unbleached chemical pulp with a protective agent and an activator in a cooking tank; and introducing high-purity oxygen and reacting under stirring;
   wherein the protective agent is one or more selected from the group consisting of magnesium oxide, magnesium hydroxide and magnesium sulfate;
   wherein the activator is one or more selected from the group consisting of nano zero-valent iron, nano zero-valent aluminum, nano zero-valent cobalt, nano zero-valent zinc and nano zero-valent nickel, and has a size of 100 nm to 500 nm; and
   wherein the reaction temperature is less than or equal to 40° C.

2. The oxygen bleaching method according to claim 1, wherein the activator is one or both of nano zero-valent iron and nano zero-valent zinc, and when the two activators are used together, the mass ratio of the two activators is 1:1 to 1:5.

3. The oxygen bleaching method according to claim 1, wherein the activator is added in an amount of 0.003%-0.5% of the absolute dry mass of the unbleached chemical pulp.

4. The oxygen bleaching method according to claim 1, wherein the protective agent is added in an amount of 1.1%-3.2% of the absolute dry mass of the unbleached chemical pulp.

5. The oxygen bleaching method according to claim 1, wherein the high-purity oxygen has a pressure of 0.3 MPa-0.6 MPa.

6. The oxygen bleaching method according to claim 1, wherein the reaction temperature is from 20° C.-40° C.; the reaction time is from 40 min-60 min.

7. The oxygen bleaching method according to claim 6, wherein the unbleached chemical pulp has a concentration of 10%-15% (w/v).

8. The oxygen bleaching method according to claim 7, wherein the unbleached chemical pulp has a concentration of 11%-13% (w/v).

9. The oxygen bleaching method according to claim 1, comprising the steps of:
   (1) weighing the protective agent and the activator, formulating them into a solution and stirring;
   (2) weighing the unbleached chemical pulp, dispersing the unbleached chemical pulp that is agglomerated, and putting into a cooking tank;
   (3) pouring the formulated solution into the cooking tank containing the unbleached chemical pulp, stirring, and then bleaching by introducing oxygen;
   (4) washing the bleached chemical pulp with water, measuring the pulp yield, performing papermaking, and then measuring brightness on a brightness meter.

10. The oxygen bleaching method according to claim 1, wherein the reaction temperature is between 20° C. and 40° C.

11. An oxygen bleaching method of pulp comprising:
mixing an unbleached chemical pulp with a protective agent and an activator in a cooking tank;
introducing high-purity oxygen; and
stirring the high-purity oxygen and the unbleached chemical pulp with the protective agent and the activator to cause a reaction,
wherein the protective agent is one or more selected from the group consisting of magnesium oxide, magnesium hydroxide and magnesium sulfate, wherein the activator is one or more selected from the group consisting of nano zero-valent iron, nano zero-valent aluminum, nano zero-valent cobalt, nano zero-valent zinc and nano zero-valent nickel, and has a size of 100 nm to 500 nm, and wherein the reaction occurs at a temperature between 20° C. and 40° C.

* * * * *